United States Patent [19]

Dugan

[11] Patent Number: 5,218,662
[45] Date of Patent: Jun. 8, 1993

[54] FIBER-OPTIC CABLE SYSTEM AND METHOD FOR DISPERSION COMPENSATION AT NODES BETWEEN END POINTS

[75] Inventor: John M. Dugan, Richardson, Tex.
[73] Assignee: Alcatel Network Systems, Inc., Richardson, Tex.
[21] Appl. No.: 879,434
[22] Filed: May 6, 1992
[51] Int. Cl.$^5$ ............................ G02B 6/02; G02F 1/00
[52] U.S. Cl. ...................... 385/123; 385/27; 385/31; 385/147; 359/118; 359/161; 359/109; 359/900
[58] Field of Search ............ 385/24, 27, 28, 29, 385/31, 38, 100, 123, 127, 128, 147; 359/118, 125, 153, 161, 179, 188, 195, 109, 900

[56] References Cited

U.S. PATENT DOCUMENTS

| | | | |
|---|---|---|---|
| 4,261,639 | 4/1981 | Kogelnik et al. | 385/123 X |
| 4,639,075 | 1/1987 | Salour et al. | 385/123 |
| 4,969,710 | 11/1990 | Tick et al. | 385/123 X |
| 5,035,481 | 7/1991 | Mollenauer | 385/123 |
| 5,042,906 | 8/1991 | Chesler et al. | 385/123 |

*Primary Examiner*—Brian Healy
*Attorney, Agent, or Firm*—Bruce C. Lutz; Dennis O. Kraft

[57] ABSTRACT

The present invention provides a method and system that compensate end-to-end optical dispersion for a fiber-optic cable having a plurality of predetermined compensations sites to within a predetermined dispersion limit using a predetermined dispersion compensation increment. With the method and system, the predetermined dispersion compensation increment may exceed both the predetermined compensation limit as well as the compensation limit divided by the number of sites. The method includes the steps of compensating optical dispersion using the compensation increment for each of the plurality of predetermined compensation sites to yield an end-to-end optical dispersion compensation within the predetermined optical dispersion limit. This may include optical dispersion over-compensation at some sites and optical dispersion under-compensation at other sites.

9 Claims, 2 Drawing Sheets

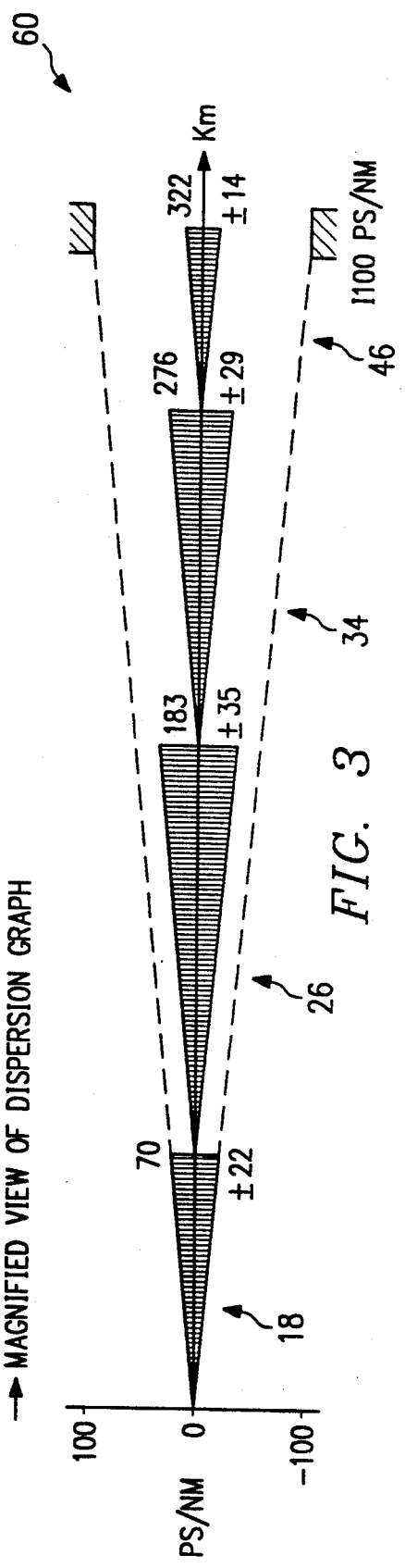
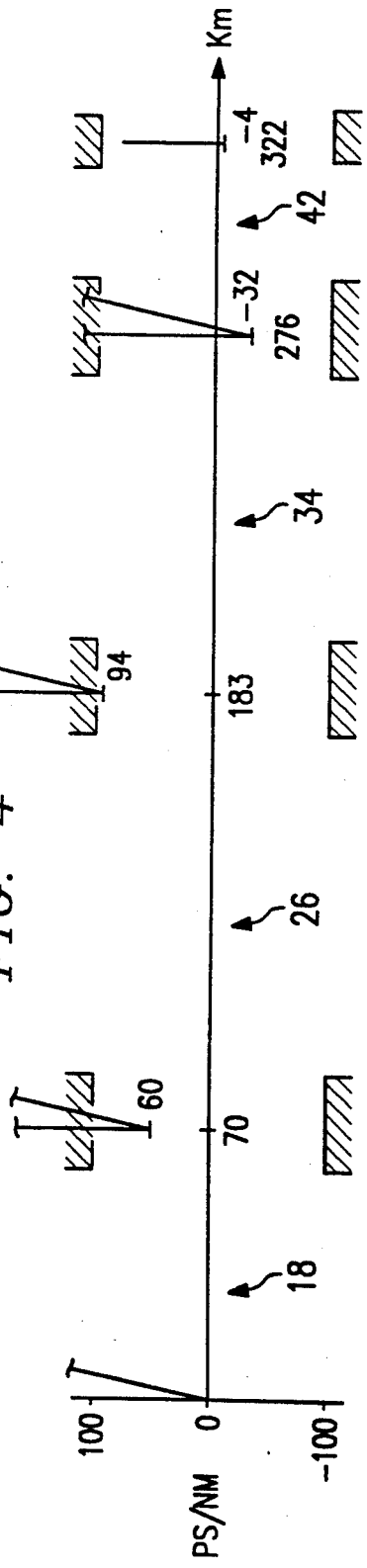
FIG. 3
FIG. 4

FIBER-OPTIC CABLE SYSTEM AND METHOD FOR DISPERSION COMPENSATION AT NODES BETWEEN END POINTS

TECHNICAL FIELD OF THE INVENTION

The present invention is concerned generally with electronics and more specifically with fiber-optic communications systems. Even more specifically, the invention is concerned with a method of compensating optical dispersion at nodes of a fiber-otic cable using a predetermined optical dispersion compensation increment to limit end-to-end optical dispersion to within a prescribed range.

BACKGROUND OF THE INVENTION

In a long optical fiber path, optical amplifiers at various intervals restore optical signal levels. Optical amplification restores the signal level, but does not correct chromatic dispersion that may accumulate along the optical path. Chromatic dispersion compensating elements can also be installed in conjunction with the amplifiers, so that all signal characteristics are restored.

The actual fiber length between amplification sites varies widely, as does the dispersion per unit length for different spools of fiber. This makes dispersion compensation a field-determined value. A straight-forward means of accomplishing the dispersion compensation is to measure the dispersion characteristic of each section of fiber (between amplification/compensation sites or nodes) and then to install the appropriate amount of dispersion compensation at the end of each section. One particularly attractive scheme of dispersion compensation uses a special compensating optical fiber that has dispersion characteristics complementary to those of the main fiber path. In this method, the amount of compensation is proportional to the length of the compensating fiber. This method for dispersion compensating, therefore, suffers from significant limitations.

Since it is impractical to adjust the length of compensating fiber on-location in the field, this method requires that large numbers of different lengths of compensating fibers be readily available. The large inventory of different lengths makes this method difficult to employ in the field.

Consequently, it is object of the present invention to provide a method for compensating each optical fiber section in a low-resolution manner so that only a small number of different lengths of compensating fiber are necessary. The present invention eliminates dispersion compensation error build-up by measuring the net dispersion from the transmit end of the path to each compensating site. It is the object of the present invention, therefore, to provide over-compensation and under-compensation at various nodes along the optical path with a view to resulting in a final end-to-end dispersion of the entire optical path within acceptable limits.

It is another object of the present invention to provide a method for compensating end-to-end optical dispersion for a fiber-optic cable having a plurality of predetermined compensation sites to within a predetermined dispersion limit by using a predetermined dispersion compensating increment and compensating optical dispersion within the compensation increment to the closest compensating point available provided that the total end-to-end optical dispersion is kept within the predetermined limit. This includes the possibility for over-compensating at some sites while under-compensating at others. By interspersing the over-compensation and under-compensation, the method yields an end-to-end optical dispersion compensation that is within the predetermined optical dispersion limit.

BRIEF DESCRIPTION OF THE DRAWINGS

The invention and its modes of use and advantages are best understood by reference to the following description of illustrative embodiments when used in conjunction with the accompanying drawings, wherein:

FIG. 3 shows a magnified view of a dispersion graph to illustrate the effects of compensating within a predetermined specification at each optical fiber node; and FIG. 4 illustrates an application of the compensation method of the preferred embodiment.

DETAILED DESCRIPTION OF THE INVENTION

Figure 1:
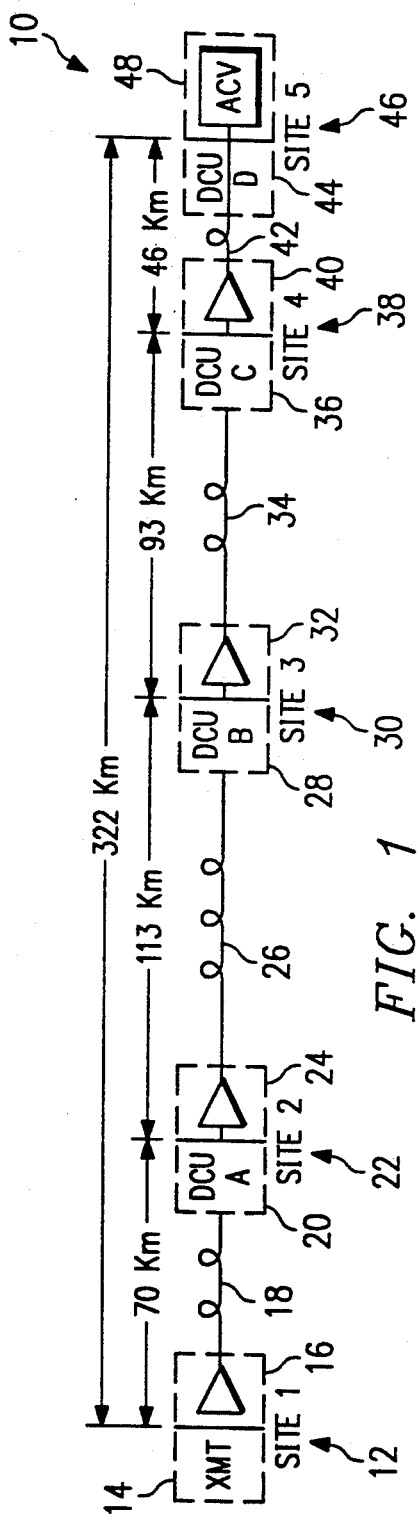
FIG. 1 provides a schematic illustration of the environment of the present invention.

In FIG. 1, optical path 10 has a length of 322 Km and begins at site 1 12 from transmit station 14. From transmit station 14, optical fiber amplifier 16 transmits optical energy along segment 18 to dispersion compensating unit (DCU) A 20 of site 2 22. From DCU A, optical amplifier 24 transmits optical energy along segment 26 to DCU B 28 of site 3 30. Amplifier 32 amplifies optical energy from DCU B 28 and transmits the optical energy along optical fiber 34 to DCU C 36 of site 4 38. Optical amplifier 40 amplifies optical energy from DCU C 36 for transmission along segment 42 to DCU D 44 of site 5 46 where receive station 48 receives the optical energy. In the example, optical path 10 of FIG. 1, the 322 Km path 10 has four segments including 70 Km segment 18, 113 Km segment 26, 93 Km segment 34, and 46 Km segment 42.

Figure 2:
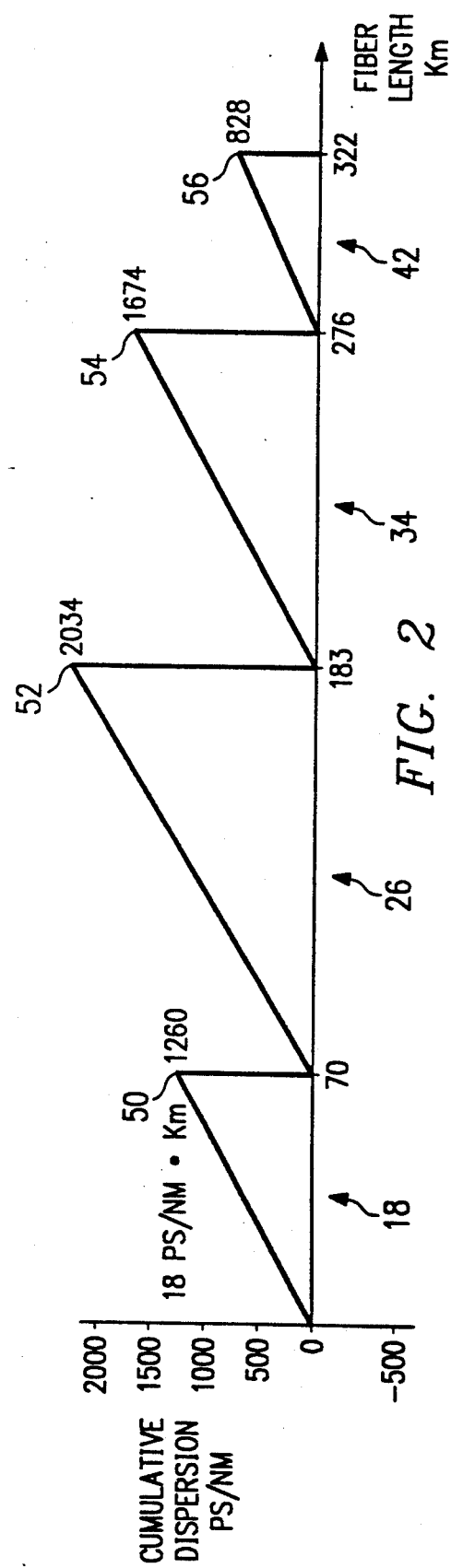
FIG. 2 shows the effects of optical dispersion without compensation.

FIG. 2 shows the cumulative optical dispersion in ps/nm for the 322 Km path 10 example of FIG. 1. Along the horizontal axis of the plot of FIG. 2 appears distance measurement in Km beginning at 0 Km and showing a maximum length of 322 Km. Along the vertical axis appears a scale of cumulative dispersion ranging from −500 to 2000 ps/nm·km. Suppose, for example, that the dispersion rate of 18 ps/nm applies to the optical fiber for optical path 10. Then, for the 70 Km segment 18, the cumulative dispersion is 1260 ps/nm at the point designated as 50, for 113 Km section 26 the cumulative dispersion is 2,034 ps/nm as point 52 indicates, for 93 Km segment 34 it is 1674 ps/nm at point 54, and 828 ps/nm at point 56 for the 43 Km segment 42. This results in a sum of 5,796 ps/nm as the total dispersion for optical path 10.

Suppose, further, that at the receive end 48 of FIG. 1, a predetermined maximum end-to-end cumulative dispersion must be within ±100 ps/nm. This is only 1.7 percent of the total optical fiber dispersion without compensation. If dispersion compensation is to be cumulative at the end of each section, then the 1.7% limit must apply at each section.

In FIG. 3, dispersion graph 60 shows the amount by which each dispersion compensation unit such as DCU A 20 at site 2 22 of FIG. 1 must compensate cumulative dispersion to satisfy the ±100 ps/nm dispersion limit. For example, for optical segment 18 having a cumulative dispersion of 1260 ps/nm, with a 1.7% accuracy the required accuracy for the segment must be ±22 ps/nm. Unfortunately, it is often not possible to have DCU's with this level of accuracy. Table I shows the necessary accuracies for each of the segments along optical path 10.

TABLE I

| Segment | Section Length | Dispersion | Required Accuracy |
|---|---|---|---|
| Segment 18 | 70 Km | 1260 ps/nm | ±22 ps/nm |
| Segment 26 | 113 Km | 2034 ps/nm | ±35 ps/nm |
| Segment 34 | 93 Km | 1674 ps/nm | ±29 ps/nm |
| Segment 42 | 46 Km | 828 ps/nm | ±14 ps/nm |
| Total | 322 Km | 5796 ps/nm | ±100 ps/nm |

Using the method that Table 1 and FIG. 3 prescribe, the total required accuracy is $(\pm 22)+(\pm 35)+(\pm 29)+(\pm 14)=\pm 100$ ps/nm. This example, therefore, satisfies the cumulative dispersion specification of ±100 ps/nm.

FIG. 4, in contrast, illustrates dispersion compensation using the method of the present invention. By measuring and monitoring the end-to-end dispersion of optical path 10 dispersion may be compensated to be within the required tolerance. For example, with reference to optical path 10, Table II shows the compensation and resulting error for each span.

TABLE II

| Segment | Segment Length | Actual Dispersion | Compensation | Cumulative Error |
|---|---|---|---|---|
| Segment 18 | 40 Km | 1260 ps/nm | −1200 ps/nm | +60 ps/nm |
| Segment 26 | 113 Km | 2034 ps/nm | −2000 ps/nmm | +94 ps/nm |
| Segment 34 | 93 Km | 1674 ps/nm | −1800 ps/nm | −32 ps/nm |
| Segment 42 | 46 Km | 828 ps/nm | −800 ps/nm | −4 ps/nm |
| Total | 322 Km | 5796 ps/nm | 5800 ps/nm | −4 ps/nm |

As Table II indicates, a −1200 ps/nm compensator applies to the actual dispersion of 1260 ps/nm so that the cumulative error after segment 18 is +60 ps/nm; and a −2000 ps/nm compensator applies to the 113 Km segment 26 having an optical dispersion of 2034 ps/nm. This further increases the error. At this point, over-compensation is appropriate. Consequently, a −1800 ps/nm compensator applies to the 93 Km segment 34 that has an actual dispersion of 1674 ps/nm. This reduces the cumulative error to −32 ps/nm. Then, a −800 ps/nm compensator applies to 46 Km segment 42 that has an actual dispersion of 828 ps/nm. This yields a total cumulative error of only −4 ps/nm.

It is important to note several characteristics of the example that FIG. 4 and TABLE II illustrate. First, the preferred embodiment uses only 200 ps/nm increments at each DCU of the respective sites 2, 3, 4, and 5 for dispersion compensation. Secondly, the method uses both under-compensation and over-compensation interspersed as desired to achieve a total or cumulative error less than the dispersion compensation limit of ±100 ps/nm in this example. Third, the method of the preferred embodiment requires far fewer pre-cut lengths of compensating fiber than that of known dispersion compensation methods. This has the beneficial effect of reducing and simplifying field inventory of optical fibers.

With these characteristics, the method of the preferred embodiment yields a significant improvement over the known methods of dispersion compensation in optical fibers. Thus, the preferred embodiment compensates each optical fiber section in a low-resolution manner so that only a small number of different lengths of compensating fiber are necessary. By measuring the net dispersion from the transmit end of the path to each compensation site, the method avoids the build-up of dispersion compensation errors and uses only a small number of compensation increment. Each section of optical fiber between the transmission sites is compensated to the nearest increment conveniently on hand (regardless of whether it is over-compensated or under-compensated). The final end-to-end dispersion of the entire optical path, however, satisfies the end-to-end optical dispersion limit.

In summary, the method of the preferred embodiment compensates end-to-end optical dispersion for a fiber-optic cable having a plurality of predetermined compensation sites to within a predetermined dispersion limit using a predetermined dispersion compensation increment and comprises the steps of over-compensating optical dispersion using the predetermined compensation increment at certain ones of the predetermined compensation sites while under-compensating optical dispersion within the predetermined compensation increment at the other predetermined compensation sites and by interspersing the over-compensating steps with the under-compensating steps to yield an end-to-end optical dispersion compensation within the predetermined optical limit.

Although the present invention and its advantages have been described in detail, it should be understood that various changes, substitutions and alterations can be made herein without departing from the spirit and scope of the invention as defined by the appended claims.

What is claimed is:

1. A method for compensating end-to-end optical dispersion for a fiber-optic cable having a plurality of predetermined compensation sites to within a predetermined dispersion limit using a predetermined dispersion compensation increment, the method comprising the steps:

over-compensating optical dispersion within said predetermined compensation increment at a first set of certain ones of said plurality of predetermined compensation sites;

under-compensating optical dispersion within said predetermined compensation increment at a second set of certain ones of said plurality of predetermined compensation sites;

interspersing said over-compensating steps with said under-compensating steps to yield an end-to-end optical dispersion compensation within said predetermined optical dispersion limit.

2. A system for compensating end-to-end optical dispersion of a fiber-optic cable having a plurality of predetermined compensation sites to within a predetermined dispersion limit using a predetermined dispersion compensation increment, the system comprising:

over-compensating means for over-compensating optical dispersion within said predetermined compensation increment at a first set of certain ones of said plurality of predetermined compensation sites;

under-compensating means for under-compensating optical dispersion within said predetermined compensation increment at a second set of certain ones of said plurality of predetermined compensation sites;

means for interspersing said over-compensating steps with said under-compensating steps to yield an end-to-end optical dispersion compensation within said predetermined optical dispersion limit.

3. A method for compensating end-to-end optical dispersion for a fiber-optic cable having a plurality of predetermined compensation sites to within a predetermined dispersion limit using a predetermined dispersion compensation increment, the method comprising the steps:

over-compensating optical dispersion within said predetermined compensation increment at a first set of certain ones of said plurality of predetermined compensation sites;

under-compensating optical dispersion within said predetermined compensation increment at a second set of certain ones of said plurality of predetermined compensation sites;

measuring the optical dispersion along successive sites comprising an optical path to determine the degree of over-compensation and under-compensation; and interspersing said over-compensating steps with said under-compensating steps to yield an end-to-end optical dispersion compensation within said predetermined optical dispersion limit.

4. A system for compensating end-to-end optical dispersion for a fiber-optic cable having a plurality of predetermined compensation sites to within a predetermined dispersion limit using a predetermined dispersion compensation increment, the system comprising:

a plurality of dispersion compensation units at each of the predetermined compensation sites for compensating optical dispersion along the fiber-optic cable, certain of said dispersion compensation units having over-compensating means for over-compensating the optical dispersion and certain other of said dispersion compensation units having under-compensating means for under-compensating said optical dispersion; and means for interspersing said over-compensating means with said under-compensating means to yield an end-to-end optical dispersion compensation within said predetermined optical dispersion limit.

5. A method for compensating a signal source to a detection end optical dispersion for a fiber-optic cable having a plurality of predetermined compensation sites to within a predetermined dispersion limit using a set of incrementally different compensator elements where the increments substantially exceed said predetermined dispersion limit, the method comprising the steps of:

(a) starting at the first of said compensation sites downstream from said signal source, measuring optical dispersion from said signal source;

(b) selecting a compensator from a set of incrementally different compensator elements for association with each of said predetermined compensation sites where each of said elements comprises a compensation increment that substantially exceeds said predetermined dispersion limit to thereby adjust total dispersion to a value as close to within said predetermined dispersion limit as possible even though the dispersion at each of said compensation sites may exceed said predetermined dispersion limit; and (c) repeating steps (a) and (b) for each site from said signal source to said detection end to yield an overall dispersion within said predetermined dispersion limit.

6. A fiber-optic cable system having a total optical dispersion from a signal source to detection end being compensated to within a predetermined specification, comprising:

an optical path comprising a plurality of fiber-optic segments;

a plurality of predetermined compensation sites, each of said compensation sites associated with one of said plurality of fiber-optic segments and comprising a dispersion compensating unit, said dispersion compensating unit having a compensation increment exceeding said predetermined specification, said plurality of compensation sites associated by cumulative over-compensation and under-compensation to produce an optical dispersion from said signal source to said detection end within said predetermined specification.

7. A method for compensating a fiber-optic cable having N compensation sites and a total end-to-end dispersion limit of L, comprising the steps of:

(a) measuring total optical dispersion from a signal source to each of said N compensation sites;

(b) selecting a compensator from a set of dispersion compensator elements each having a predetermined compensation increment, where said increment substantially exceeds L divided by N, for adjusting total dispersion to a value as close to L as possible using said increment such that dispersion between compensation sites may exceed L/N; and (c) repeating steps (a) and (b) for each site from said signal source to said an end of said fiber-optic end to yield an overall dispersion within said predetermined dispersion limit.

8. An optical path having N compensation sites and a total end-to-end dispersion within a predetermined end-to-end dispersion limit L, comprising:

a compensator at each of said N compensation sites, said compensator selected from a plurality of dispersion compensators each having a predetermined compensation increment where the said increment may substantially exceed L divided by N, said compensator being chosen to adjust total dispersion to a value as close to said end-to-end dispersion limit L as possible using said compensation increment and such that dispersion at each of said N compensation sites may exceed L divided by N; and means for associating each of said N compensation sites to yield an end-to-end dispersion of said optical path of less than L.

9. A method for compensating a fiber-optic cable comprising the steps of:

(a) measuring total optical dispersion from a signal source to a given site; and (b) selecting a compensator from a set of dispersion compensator elements each having a predetermined compensation increment, where said increment may exceed a total end-to-end dispersion limit permitted for said fiber-optic cable.

* * * * *